(12) United States Patent
Howe, Jr.

(10) Patent No.: US 6,664,471 B1
(45) Date of Patent: Dec. 16, 2003

(54) SOCKET COVER

(76) Inventor: Jeffrey K. Howe, Jr., 3131 River Trace, Gastonia, NC (US) 28056

( * ) Notice: Subject to any disclaimer, the term of this patent is extended or adjusted under 35 U.S.C. 154(b) by 0 days.

(21) Appl. No.: 10/347,445

(22) Filed: Jan. 21, 2003

(51) Int. Cl.[7] ................................................. H02G 3/14
(52) U.S. Cl. .................... 174/66; 174/67; 220/241; 220/242
(58) Field of Search ................... 174/66, 67; 220/241, 220/242; D8/353; D13/177; 312/328

(56) References Cited

U.S. PATENT DOCUMENTS

| | | | |
|---|---|---|---|
| 4,801,271 A | 1/1989 | Piper | |
| 5,285,014 A | * 2/1994 | Gilchrist | ...................... 174/67 |
| D383,727 S | 9/1997 | Caruso et al. | |
| 5,723,816 A | * 3/1998 | Neece | ......................... 174/66 |
| 6,051,788 A | 4/2000 | Nichols | |
| 6,103,974 A | 8/2000 | Erdfarb | |
| 6,328,584 B1 | * 12/2001 | Follett | ......................... 439/222 |

* cited by examiner

Primary Examiner—Dhiru R Patel

(57) ABSTRACT

A socket cover for releasably attaching to and covering a plurality of female sockets each having a pair of receptacles therein. The socket cover includes a panel having an outer surface and an inner surface. Each of plurality of prongs is attached to the inner surface such that the prongs extend away from the inner surface. The prongs are positioned such that pairs of prongs are defined. Each of the pairs is positioned such that each of the pairs of prongs is alignable with one of the pairs of receptacles. The number of pairs of prongs equals the number of the female sockets. Each of the prongs includes an insulated material. The prongs may be removably positioned in the receptacles such that the panel covers the female sockets.

9 Claims, 2 Drawing Sheets

SOCKET COVER

BACKGROUND OF THE INVENTION

1. Field of the Invention

The present invention relates to removable socket coverings and more particularly pertains to a new removable socket covering for protecting the receptacle and wiring inside its associated box during the course of a painting project.

2. Description of the Prior Art

The use of removable socket coverings is known in the prior art. U.S. Pat. No. 6,103,974 describes a painter's protection device for covering an electrical outlet. Another type of removable socket covering is U.S. Pat. No. 4,801,271 describes a safety cover for electrical outlets. U.S. Pat. No. Des. 383,727 describes an ornamental design for a cover plate for electrical receptacles. U.S. Pat. No. 6,051,788 describes an electrical outlet safety plate configured to preclude simultaneous contact of the fingers of a person with the electrical contact prongs of an electrical plug.

While these devices fulfill their respective, particular objectives and requirements, the need remains for a device that protects the receptacle from being painted but also provides protection against the possibility of electrical shock from wires or terminals of the electrical receptacle.

SUMMARY OF THE INVENTION

The present invention meets the needs presented above by using a panel and sidewalls to completely cover the receptacle and the housing.

Another object of the present invention is to provide a new removable socket covering that could be installed and removed in a matter of seconds without the use of tools.

Still another object of the present invention is to provide a new removable socket covering that would ensure that hot and neutral wires are not covered with paint such that they may be clearly identified during any subsequent electrical work.

To this end, the present invention generally comprises a device for releasably attaching to and covering an electrical housing having a plurality of female sockets each having a pair of receptacles therein. The device comprises a panel having an outer surface and an inner surface. The panel has a top edge, a bottom edge and a pair of side edges. Each of plurality of prongs has a first end and a second end. Each of the first ends is attached to the inner surface such that the prongs extend away from the inner surface. The prongs are positioned such that pairs of prongs are defined. Each of the pairs is positioned such that each of the pairs of prongs is alignable with one of the pairs of receptacles. The number of pairs of prongs equals the number of the female sockets. Each of the prongs comprises an insulated material. The prongs may be removably positioned in the receptacles such that the panel covers the female sockets.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
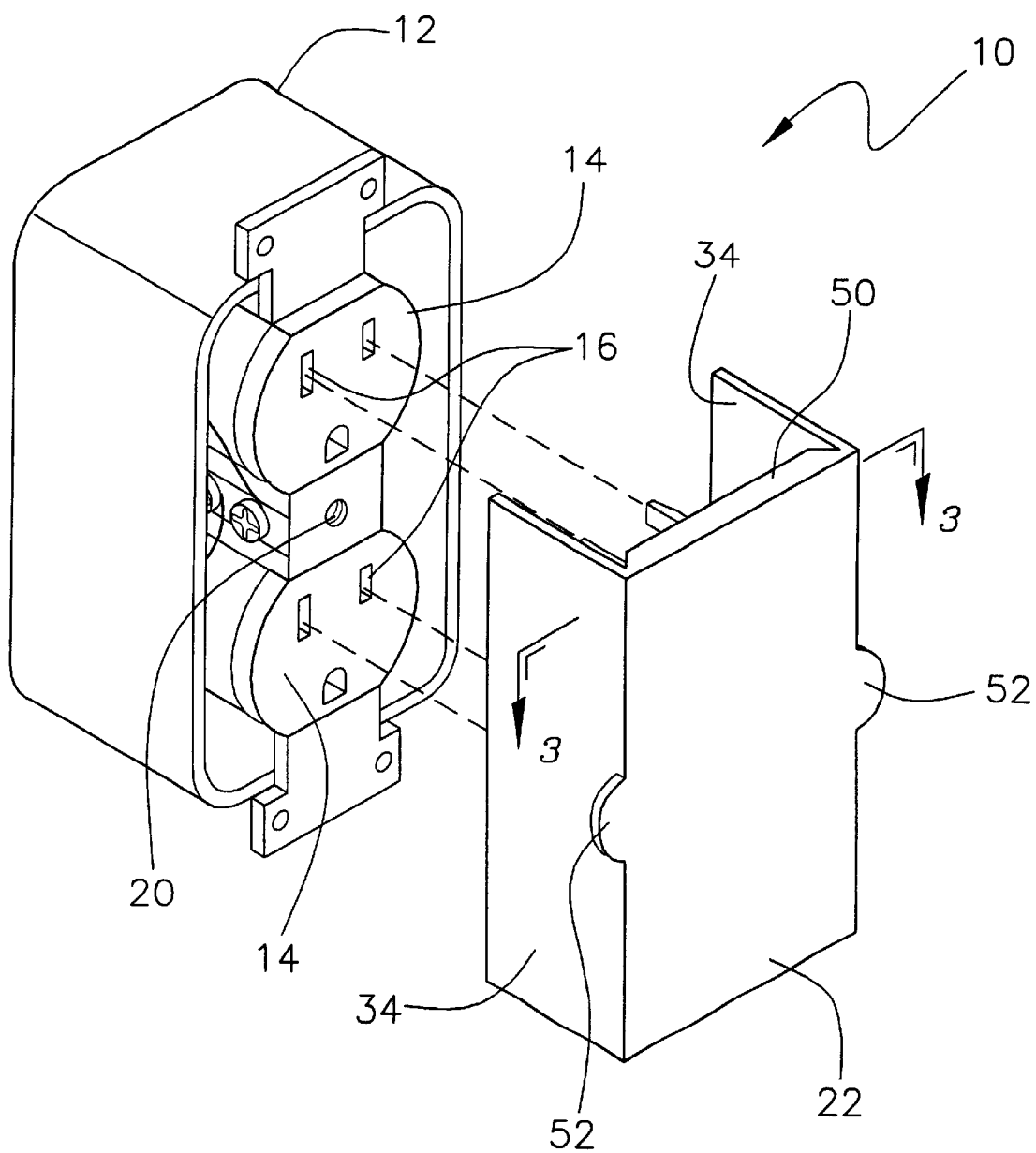
FIG. 1 is a perspective view of a socket cover according to the present invention.
Figure 2:
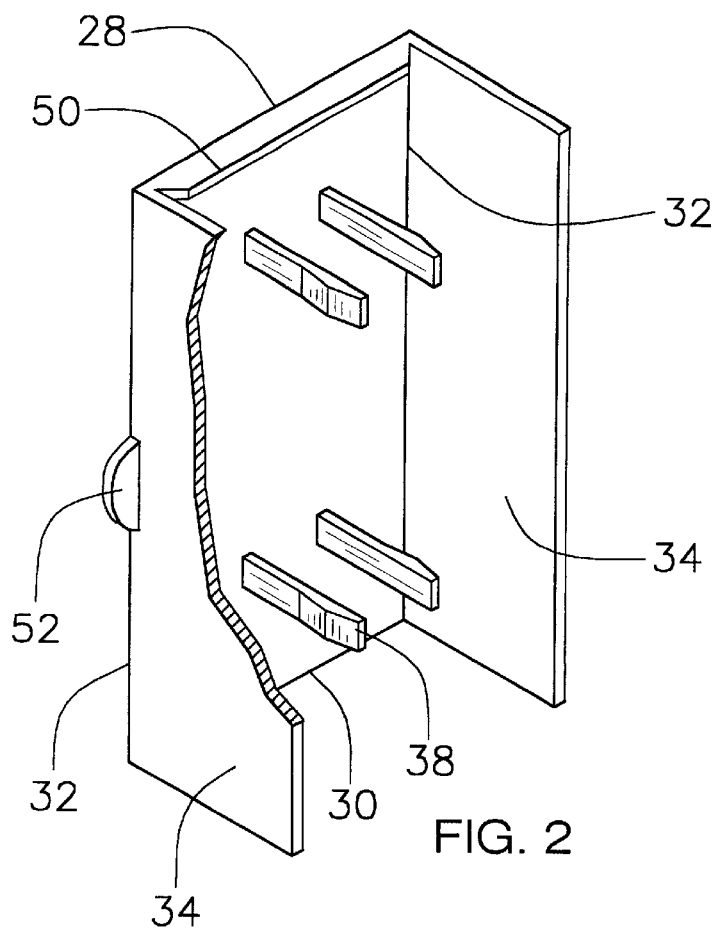
FIG. 2 is a perspective view of the present invention.
Figure 3:
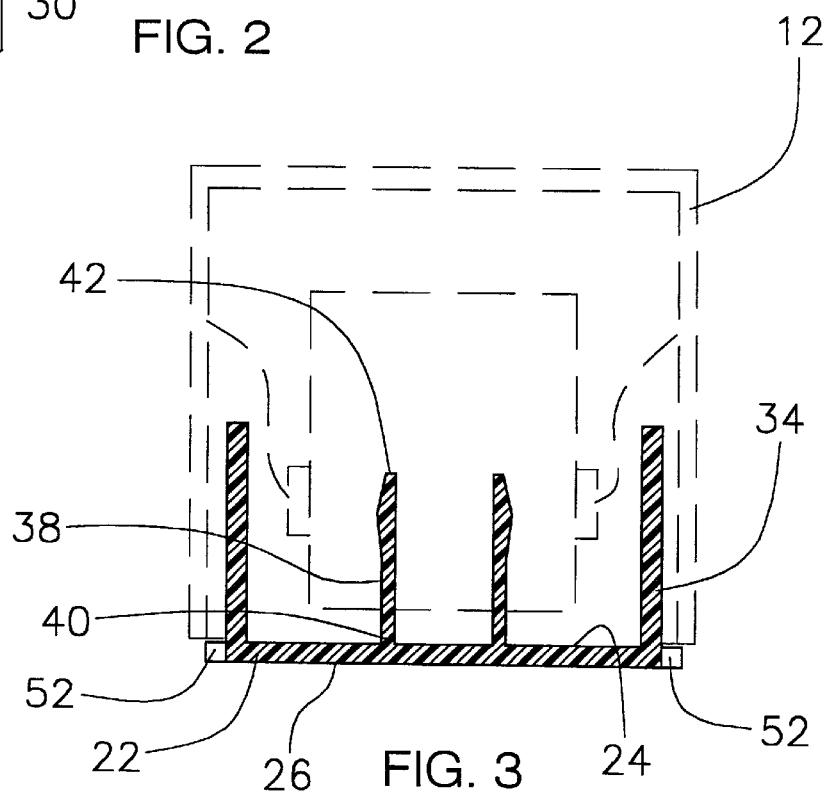
FIG. 3 is a cross-sectional view taken along the line 3—3 of FIG. 1 of the present invention.

With reference now to the drawings, and in particular to FIGS. 1 through 3 thereof, a new removable socket covering embodying the principles and concepts of the present invention and generally designated by the reference numeral 10 will be described.

As best illustrated in FIGS. 1 through 3, a socket cover 10 generally comprises a device for releasably attaching to and covering an electrical housing 12 having a plurality of female sockets 14 (sockets) each having a pair of receptacles 16 therein. The sockets 14 are preferably conventional electrical sockets 14 found in a dwelling and positioned in the electrical housing 12. The housing 12 has a centrally located well 20 therein. The well 20 is threaded. Typically, a covering, not shown, with openings for allowing access to the sockets 14, is positioned over the electrical housing 12 to protect a person from electric shock. This covering is often removed during wall papering or painting so that the covering does not get covered with paint or hinder the application of the wallpaper.

The socket cover 10 comprises a panel 22 that has an outer surface 24 and an inner surface 26. The panel 22 has a top edge 28, a bottom edge 30 and a pair of side edges 32, a pair of side walls 34, each of the side walls 34 is attached to and extends away from one of the side edges 32 wherein the side walls 34 extend over either side of the sockets 18 and into the housing 12 when the outer surface 24 is adjacent to the socket 18. Each of the side walls 34 lies in planes orientated generally perpendicular to a plane of the panel 22. The side walls 34 extend between the top 28 and bottom 30 edges. The panel 22 has an opening 36 therein. The opening 36 is centrally located in the panel 22.

Each of a plurality of prongs 38 has a first end 40 and a second end 42. Each of the first ends 40 is attached to the inner surface 24 such that the prongs 38 extend away from the inner surface 24. The prongs 38 are positioned such that pairs of prongs 38 are defined. Each of the pairs is positioned such that each of the pairs of prongs 38 is alignable with one of the pairs of receptacles 16. The number of pairs equals the number of the female sockets 18. Preferably there are two pairs of prongs 38. But the device may be made for socket clusters of more than 2 such as 4, though 2 is the most common. Each of the prongs 38 of each pair of prongs 38 is positioned along a line that is oriented parallel to the top edge 28 of the panel 22. The prongs 38 comprise an insulated material such as a plastic or elastomeric material.

A flange 50 is preferably attached to and extends along the top edge 28 of the panel 22. The flange 50 extends over the sockets 14 when the inner surface 24 is adjacent to the sockets 14. The flange 50 prevents dripping of paint over the top edge 28 and onto the sockets 14.

A pair of tabs 52 is attached to the panel 22. Each of the tabs 52 is positioned along a junction of one of the side walls 34 and the panel 22. Each of the tabs 52 is generally co-planar with the panel 22. The tabs 52 are preferably positioned generally between the top edge 28 and the bottom edge 30. The tabs 52 are used as grips to assist the user with removing the device 10 from the sockets 14.

In use, the covering is removed from the electrical housing 12. The prongs 38 may be removably positioned in the receptacles 16 such that the panel 22 covers the female sockets 14. The prongs 38 hold the socket covering 10 in place, though the securing member 44 may also be used to help the secure the panel 22 in place. The user may then paint without getting paint in the sockets. When the user is finished painting, the panel 22 is removed and the covering replaced.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A removable socket cover device for releasably attaching to and covering a plurality of female sockets each having a pair of receptacles therein, the plurality of female sockets being positioned with an electrical housing, the housing having a centrally located well therein, the well being threaded, the cover device comprising:

a panel having an outer surface and an inner surface, said panel having a top edge, a bottom edge and a pair of side edges; and a plurality of prongs, each of said prongs having a first end and a second end, each of said first ends being attached to said inner surface such that said prongs extend away from said inner surface, said prongs being positioned such that pairs of prongs are defined, each of said pairs of prongs being positioned such that each of said pairs of prongs is alignable with one of the pairs of receptacles, wherein the number of pairs of prongs equals the number of the female sockets, each of said prongs comprising an insulated material;

a pair of side walls, each of said side walls being attached to and extending away from one of said side edges wherein said side walls extend into the housing and over either side of the sockets when said inner surface is adjacent to the sockets; and wherein said prongs may be removably positioned in said receptacles such that the female sockets are covered by the panel.

2. The removable socket cover device of claim 1, wherein each of said side walls extending between said top and bottom edges.

3. The removable socket cover device of claim 1, further including a flange being attached to and extending along said top edge of said panel, said flange extending over the sockets when said inner surface is adjacent to the sockets.

4. The removable socket cover device of claim 3, further including a pair of tabs being attached to said panel, each of said tabs being positioned along a junction of one of said side walls and said panel.

5. The removable socket cover device of claim 4, wherein each of said tabs is generally co-planar with said panel.

6. The removable socket cover device as in claim 5, wherein each of said tabs is positioned generally between said top edge and said bottom edge.

7. The removable socket cover device of claim 1, further including a pair of tabs being attached to said panel, each of said tabs being positioned along a junction of one of said side walls and said panel.

8. A removable socket cover device for releasably attaching to and covering a plurality of female sockets each having a pair of receptacles therein, the plurality of female sockets being positioned with an electrical housing the cover device comprising:

a panel having an outer surface and an inner surface, said panel having a top edge, a bottom edge and a pair of side edges, a pair of side walls, each of said side walls being attached to and extending away from one of said side edges wherein said side walls extend into the housing and over either side of the sockets when said inner surface is adjacent to the sockets, each of said side walls lying in planes orientated generally perpendicular to a plane of said panel, each of said side walls extending between said top and bottom edges;

a flange being attached to and extending along said top edge of said panel, said flange extending over the sockets when said inner surface is adjacent to the sockets;

a pair of tabs being attached to said panel, each of said tabs being positioned along a junction of one of said side walls and said panel, each of said tabs being generally co-planar with said panel, each of said tabs being positioned generally between said top edge and said bottom edge;

a plurality of prongs, each of said prongs having a first end and a second end, each of said first ends being attached to said inner surface such that said prongs extend away from said inner surface, said prongs being positioned such that pairs of prongs are defined, each of said pairs of prongs being positioned such that each of said pairs of prongs is alignable with one of the pairs of receptacles, wherein the number of pairs equals the number of the female sockets, wherein there are two pairs of prongs, each of said prongs of each pair of prongs being positioned along a line oriented parallel to said top edge of said panel, each of said prongs comprising an insulated material; and wherein said prongs may be removably positioned in said receptacles such that the female sockets are covered by the panel.

9. A removable socket cover device for releasably attaching to and covering a plurality of female sockets each having a pair of receptacles therein, the plurality of female sockets being positioned with an electrical housing, the cover device comprising:

a panel having an outer surface and an inner surface, said panel having a top edge, a bottom edge and a pair of side edges; and a plurality of prongs, each of said prongs having a first end and a second end, each of said first ends being attached to said inner surface such that said prongs extend away from said inner surface, said prongs being positioned such that pairs of prongs are defined, each of said pairs of prongs being positioned such that each of said pairs of prongs is alignable with one of the pairs of receptacles, wherein the number of pairs of prongs equals the number of the female sockets, each of said prongs comprising an insulated material;

a pair of side walls, each of said side walls being attached to and extending away from one of said side edges wherein said side walls extend into the housing and over either side of the sockets when said inner surface is adjacent to the sockets;

a pair of tabs being attached to said panel, each of said tabs being positioned along a junction of one of said side walls and said panel; and wherein said prongs may be removably positioned in said receptacles such that the female sockets are covered by the panel.

* * * * *